(12) United States Patent
Pfadler et al.

(10) Patent No.: US 11,454,512 B2
(45) Date of Patent: Sep. 27, 2022

(54) SYSTEM, TRANSPORTATION VEHICLE, NETWORK COMPONENT, APPARATUSES, METHODS, AND COMPUTER PROGRAMS FOR A TRANSPORTATION VEHICLE AND A NETWORK COMPONENT

(71) Applicant: VOLKSWAGEN AKTIENGESELLSCHAFT, Wolfsburg (DE)

(72) Inventors: Andreas Pfadler, Berlin (DE); Ahmad El Assaad, Wolfsburg (DE); Daniel Reimann, Braunschweig (DE); Guillaume Jornod, Berlin (DE)

(73) Assignee: Volkswagen Aktiengesellschaft

( * ) Notice: Subject to any disclaimer, the term of this patent is extended or adjusted under 35 U.S.C. 154(b) by 182 days.

(21) Appl. No.: 16/784,499

(22) Filed: Feb. 7, 2020

(65) Prior Publication Data
US 2020/0256697 A1  Aug. 13, 2020

(30) Foreign Application Priority Data

Feb. 13, 2019 (EP) .................................... 19156822

(51) Int. Cl.
*G01C 21/36* (2006.01)
*H04W 4/44* (2018.01)
*G08G 1/01* (2006.01)

(52) U.S. Cl.
CPC ....... *G01C 21/3691* (2013.01); *G08G 1/0133* (2013.01); *H04W 4/44* (2018.02)

(58) Field of Classification Search
None
See application file for complete search history.

(56) References Cited

U.S. PATENT DOCUMENTS 9,832,241 B1 * 11/2017 Hayward ............... G01S 19/50
10,048,683 B2    8/2018 Levinson et al.
(Continued)

FOREIGN PATENT DOCUMENTS

CN   106153352 A   11/2016
CN   108292134 A    7/2018
(Continued)

OTHER PUBLICATIONS

Office Action for Chinese Patent Application No. 202010090398.8; dated Oct. 11, 2021.
(Continued)

*Primary Examiner* — Aniss Chad
*Assistant Examiner* — Madison R Hughes
(74) *Attorney, Agent, or Firm* — Barnes & Thornburg, LLP (57) ABSTRACT

A system, a transportation vehicle, a network component, apparatuses, methods, and computer programs for a transportation vehicle and a network component. The method for a transportation vehicle and for verifying a proposed route includes determining an exceptional traffic situation based on an environmental model for the transportation vehicle and transmitting information related to the exceptional traffic situation to a network component using a mobile communication system. The method also includes receiving information related to a proposed route from a network component, and verifying the proposed route based on the environmental model of the transportation vehicle.

12 Claims, 5 Drawing Sheets

(56) References Cited

U.S. PATENT DOCUMENTS

| | | |
|---|---|---|
| 10,571,285 B2 | 2/2020 | Wang et al. |
| 2013/0285855 A1* | 10/2013 | Dupray ................ G01S 5/0278 342/451 |
| 2014/0214259 A1 | 7/2014 | Trepagnier et al. |
| 2016/0139594 A1 | 5/2016 | Okumura et al. |
| 2017/0123419 A1 | 5/2017 | Levinson et al. |
| 2017/0192423 A1 | 7/2017 | Rust et al. |
| 2018/0188031 A1 | 7/2018 | Samper et al. |
| 2018/0370546 A1 | 12/2018 | Augst et al. |
| 2019/0011910 A1 | 1/2019 | Lockwood et al. |
| 2019/0012909 A1* | 1/2019 | Mintz ................... G08G 1/017 |
| 2020/0004240 A1 | 1/2020 | Biehler et al. |

FOREIGN PATENT DOCUMENTS

| | | |
|---|---|---|
| CN | 108602510 A | 9/2018 |
| CN | 108734980 A | 11/2018 |
| CN | 108811022 A | 11/2018 |
| DE | 102016225606 A1 | 6/2018 |
| DE | 102017213204 A1 | 2/2019 |
| WO | 2017079474 A2 | 5/2017 |
| WO | 2018232032 A1 | 12/2018 |

OTHER PUBLICATIONS

Office Action for Chinese Patent Application No. 202010090398.8; dated May 6, 2022.

* cited by examiner

FIG. 5

SYSTEM, TRANSPORTATION VEHICLE, NETWORK COMPONENT, APPARATUSES, METHODS, AND COMPUTER PROGRAMS FOR A TRANSPORTATION VEHICLE AND A NETWORK COMPONENT

PRIORITY CLAIM

This patent application claims priority to European Patent Application No. 19156822.9, filed 13 Feb. 2019, the disclosure of which is incorporated herein by reference in its entirety.

SUMMARY

Illustrative embodiments relate to a system, a transportation vehicle, a network component, apparatuses, methods, and computer programs for a transportation vehicle and a network component, more particularly, but not exclusively, to a concept for verifying or consistency checking of an external route proposal in a transportation vehicle.

BRIEF DESCRIPTION OF THE DRAWINGS

Disclosed embodiments will be described using the following non-limiting apparatuses, methods, computer programs, or computer program products by way of example only, and with reference to the accompanying figures, in which.

DETAILED DESCRIPTION

Document US 2014/0214259 A1 describes a concept for recognizing a driver impairment in a transportation vehicle. The concept checks if a driven path diverts from a predetermined path and then checks whether certain activities a of driver have taken place. The concept solves the problem of consistency checking own sensor data to enable autonomous driving. Document US 2017/0123419A1 discloses using artificial intelligence and machine learning mechanisms to predict a course of action for a transportation vehicle in an autonomous driving scenario. Telemetric data is obtained from a tele-operator with instruction and policy data to operate an automated transportation vehicle. Document US 2018/0188031 A1 discloses a concept for calibrating transportation vehicle dynamics expectations.

Document US 2016/0139594 A1 discloses a concept for remotely operating an autonomous passenger vehicle. When an autonomous transportation vehicle encounters an unexpected driving environment unsuitable for autonomous operation, such as road construction or an obstruction, transportation vehicle sensors can capture data about the transportation vehicle and the unexpected driving environment, including images, radar and lidar data, etc. The captured data can be sent to a remote operator. The remote operator can manually operate the transportation vehicle remotely or issue commands to the autonomous transportation vehicle to be executed by or on various transportation vehicle systems. The captured data sent to the remote operator can be optimized to conserve bandwidth, such as by sending a limited subset of the captured data.

Conventional concepts consider management and tracing of a transportation vehicle's trajectory. Certain precautionary measures are used to determine a driver impairment or miscalibration of components, resolving anomaly events, respectively. These concepts do not deal with handling of false information. There is a demand for an improved concept for handling information in exceptional traffic situations for automated driving.

Disclosed embodiments are based on the finding that there are traffic situations, e.g., if an obstacle is in the regular way, which cannot be resolved by automated driving mechanisms. In such an exceptional traffic situation external information may be used, e.g., as provided by a control center for tele-operated driving. However, such information may be manipulated. It is communicated through multiple networks, network components and mobile communication systems. Disclosed embodiments are based on the finding that a verification can be carried out in a transportation vehicle and a consistency check for such external information can be enabled. Transportation vehicles with their growing number of sensors may determine an environmental model, which can serve as a basis for the verification of external data.

Disclosed embodiments provide a method for a transportation vehicle and for verifying a proposed route. The method comprises determining an exceptional traffic situation based on an environmental model for the transportation vehicle, and transmitting information related to the exceptional traffic situation to a network component using a mobile communication system. The method further comprises receiving information related to a proposed route from a network component, and verifying the proposed route based on the environmental model of the transportation vehicle. Disclosed embodiments may provide enhanced security by verifying external route proposals in exceptional traffic situations. For example, sensor data may be used to determine data on which the environmental model is based. Consequently, details of the environmental model may be based on estimations. The presence of an object might not be certain, but the object may be present with a certain probability only. The proposed route can be evaluated with the environmental model. For example, the probability that objects are in the way of the proposed route can be determined and verification of the proposed route can be enabled.

The verifying may comprise carrying out a consistency check on the proposed route based on the environmental model. The environmental model determined in a transportation vehicle may provide an efficient basis for determining routes out of a specific traffic situation. A proposed route can therefore be checked for consistency in view of the environmental model. Since the environmental model is determined internally, an independent method or mechanism for consistency checks can be provided in disclosed embodiments.

At least in some disclosed embodiments the receiving may further comprise receiving information related to a network generated environmental model of the transportation vehicle from the network component. The verifying may comprise carrying out a consistency check on the network generated network environmental model and the environmental model of the transportation vehicle. Disclosed embodiments may enable consistency checks between environmental models in the network and in the transportation vehicle. The quality of the environmental model in the transportation vehicle may be improved. At the same time, routes out of the exceptional traffic situation can be evaluated based on the improved environmental model.

The method may further comprise determining one or more route versions resolving the exceptional traffic situation based on the environmental model. A route version can be related to a confidence level, which indicates a confidence on whether the route version solves the exceptional traffic situation. For example, route versions may be based on whether certain objects (obstacles, other road participants, trees, traffic signs/lights, etc.) in the environmental model are present or not. The verifying may comprise comparing the information related to the proposed route to the one or more route versions. Disclosed embodiments may therewith enable an efficient way of evaluating a proposed route against several locally determined route versions. The verifying may, for example, be considered successful if a confidence level for a route version corresponding to the proposed route is above a predefined threshold. Disclosed embodiments may enable a threshold comparison to verify a proposed route.

In further disclosed embodiments the method may comprise determining a manipulated environmental model for the transportation vehicle, the manipulated environmental model may comprise hypothetical amendments of the environmental model with a certain confidence level. The verifying may then be based on the manipulated environmental model. Disclosed embodiments may enable to determine multiple (manipulated) versions of the environmental model based on different hypothesis, for example, presence or absence of objects. The proposed route may then be verified based on the manipulated models, e.g., based on a confidence of the respective manipulations.

For example, the manipulated environmental model comprises a manipulated environmental model list of manipulated objects and a corresponding confidence level of the manipulation. If the proposed route would be suitable for one of the manipulated environmental models, i.e., if the exceptional traffic situation could be resolved by the proposed route in the manipulated model, the confidence of manipulated model may serve as a confidence of the proposed route.

The transmitting may comprise transmitting information related to the environmental model to the network component in some disclosed embodiments. The receiving may then comprise receiving information related to a modification of the environmental model from the network component. The method may further comprise adapting the environmental model based on the information related to the modification. Disclosed embodiments may enable improvements of the environmental model of a transportation vehicle by providing a network perspective of the environmental model, for example, confidence levels in the environmental model may be amended based on the network perspective, objects may be added or removed.

In some disclosed embodiments the method may comprise determining a route version resolving the exceptional traffic situation based on the adapted environmental model. The verifying may comprise comparing the information related to the proposed route to the route version, which is based on the adapted model. The proposed route may therewith be evaluated by the manipulated/improved environmental model leading to further security enhancements in some disclosed embodiments. The verifying may further comprise carrying out a plausibility check on the modifications/adaptations of the environmental model. Disclosed embodiments may enable a first plausibility/consistency check on model adaptation and then a second consistency check of the proposed route based on the adapted environmental model.

Disclosed embodiments also provide a method for a network component of a mobile communication system. The method comprises receiving information related to an exceptional traffic situation from a transportation vehicle using the mobile communication system and determining an environmental model for the transportation vehicle. The method further comprises determining a proposed route resolving the exceptional traffic situation for the transportation vehicle and transmitting information related to the environmental model and information related to the proposed route to the transportation vehicle.

An apparatus for a transportation vehicle is another disclosed embodiment. The apparatus comprises one or more interfaces, which are configured to communicate in a mobile communication system. The apparatus further comprises a control module, which is configured to control the one or more interfaces. The control module is further configured to perform one of the methods described herein. Yet another disclosed embodiment is an apparatus for a network component. The apparatus comprises one or more interfaces, which are configured to communicate in a mobile communication system. The apparatus further comprises a control module, which is configured to control the one or more interfaces. The control module is further configured to perform one of the methods described herein.

Further disclosed embodiments are a transportation vehicle or a network component comprising one of the apparatuses described herein. Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

A challenge in teleoperated driving is to specify interfaces between the autonomous transportation vehicle and the command center. Disclosed embodiments may provide such a specification using a definition of the information exchanged between them, which may imply defining a level of immersion of a tele operated driver in a driving situation as well as the level of command. In some tele-operated scenarios, a command center (CC) may take over full control of a transportation vehicle. The transportation vehicle may then send all its information to the CC, which remotely drives the transportation vehicle with commands directly input to the transportation vehicle's controller. This may involve exchanging large amounts of information and any consistency and/or safety checks are done manually by a human driver who is not in the transportation vehicle. Tele-operated driving has not been implemented in an uncontrolled environment.

For example, if an object (parking/unloading transportation vehicle) blocks a one-way street, a way passing the transportation vehicle may require driving a short section on the sidewalk. Driving on a side walk may, however, not be allowed in normal automated driving mode. Once such an exceptional traffic situation is detected, a communication with a network component can resolve the situation, for example, by switching to tele-operated driving or by receiving instructions on a route section that resolves the traffic situation. Disclosed embodiments are based on the finding that such a proposed route section can be automatically verified based on an environmental model determined by the transportation vehicle.

Figure 1:
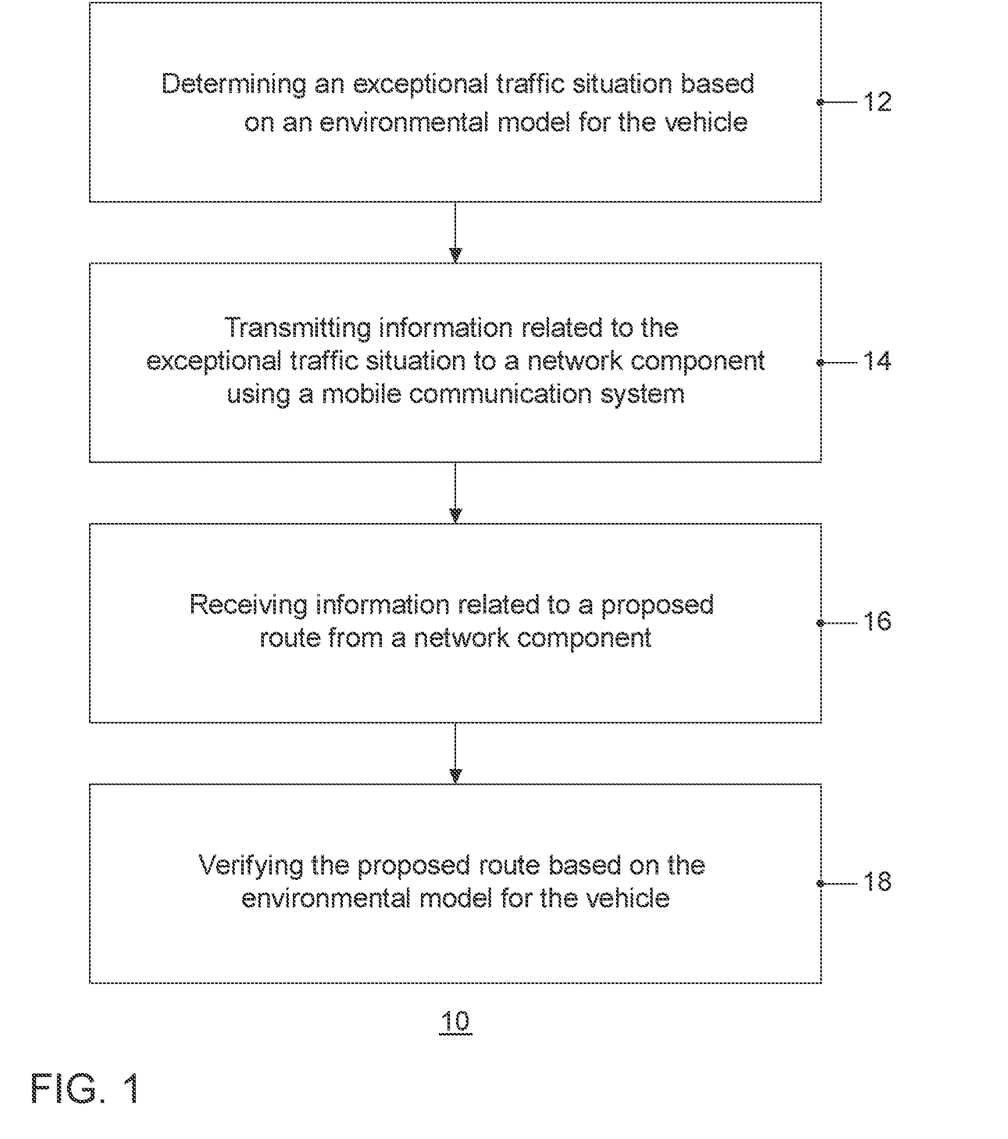
FIG. 1 illustrates a block diagram of an embodiment of a method for a transportation vehicle.

FIG. 1 illustrates a block diagram of a disclosed embodiment of a method 10 for a transportation vehicle 100 and for verifying a proposed route. The method 10 comprises determining 12 an exceptional traffic situation based on an environmental model for the transportation vehicle 100. The method further comprises transmitting 14 information related to the exceptional traffic situation to a network component using a mobile communication system. The method 10 further comprises receiving 16 information related to a proposed route from a network component 200, and verifying 18 the proposed route based on the environmental model of the transportation vehicle 100. Disclosed embodiments may enable automated consistency checks on external route proposals in a transportation vehicle. The verifying 18 may comprise carrying out a consistency check on the proposed route based on the environmental model.

As will be detailed subsequently, in addition to the environmental model of the transportation vehicle there may be another environmental model determined by the network, network component, respectively. The environmental model of the transportation vehicle may hence be improved, verified or checked based on the network model. In some disclosed embodiments the network component may hence provide information related to the network generated environmental model to the transportation vehicle.

Figure 2:
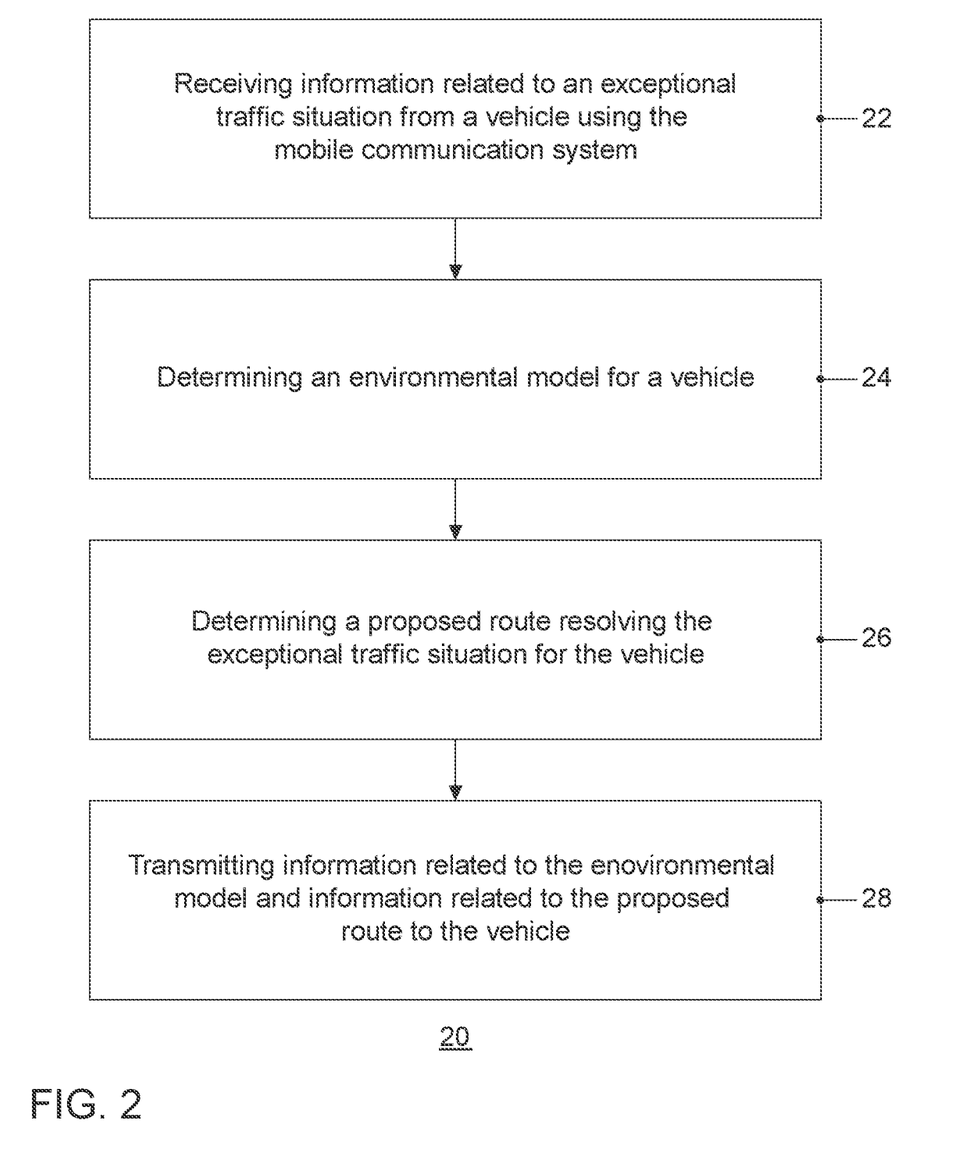
FIG. 2 illustrates a block diagram of an embodiment of a method for a network component.

FIG. 2 illustrates a block diagram of a disclosed embodiment of a method 20 for a network component of a mobile communication system. The method 20 comprises receiving 22 information related to an exceptional traffic situation from a transportation vehicle using the mobile communication system. The method further comprises determining 24 an environmental model for a transportation vehicle, and determining a proposed route resolving the exceptional traffic situation for the transportation vehicle. The method further comprises transmitting information related to the environmental model and information related to the proposed route to the transportation vehicle. In disclosed embodiments consistency checks of the environmental model of the transportation vehicle may be enabled based on information on a network generated environmental model.

On the transportation vehicle side the receiving 16 may further comprise receiving information related to a network generated environmental model of the transportation vehicle from the network component. The verifying 18 may comprise carrying out a consistency check on the network generated environmental model and the environmental model of the transportation vehicle.

Figure 3:
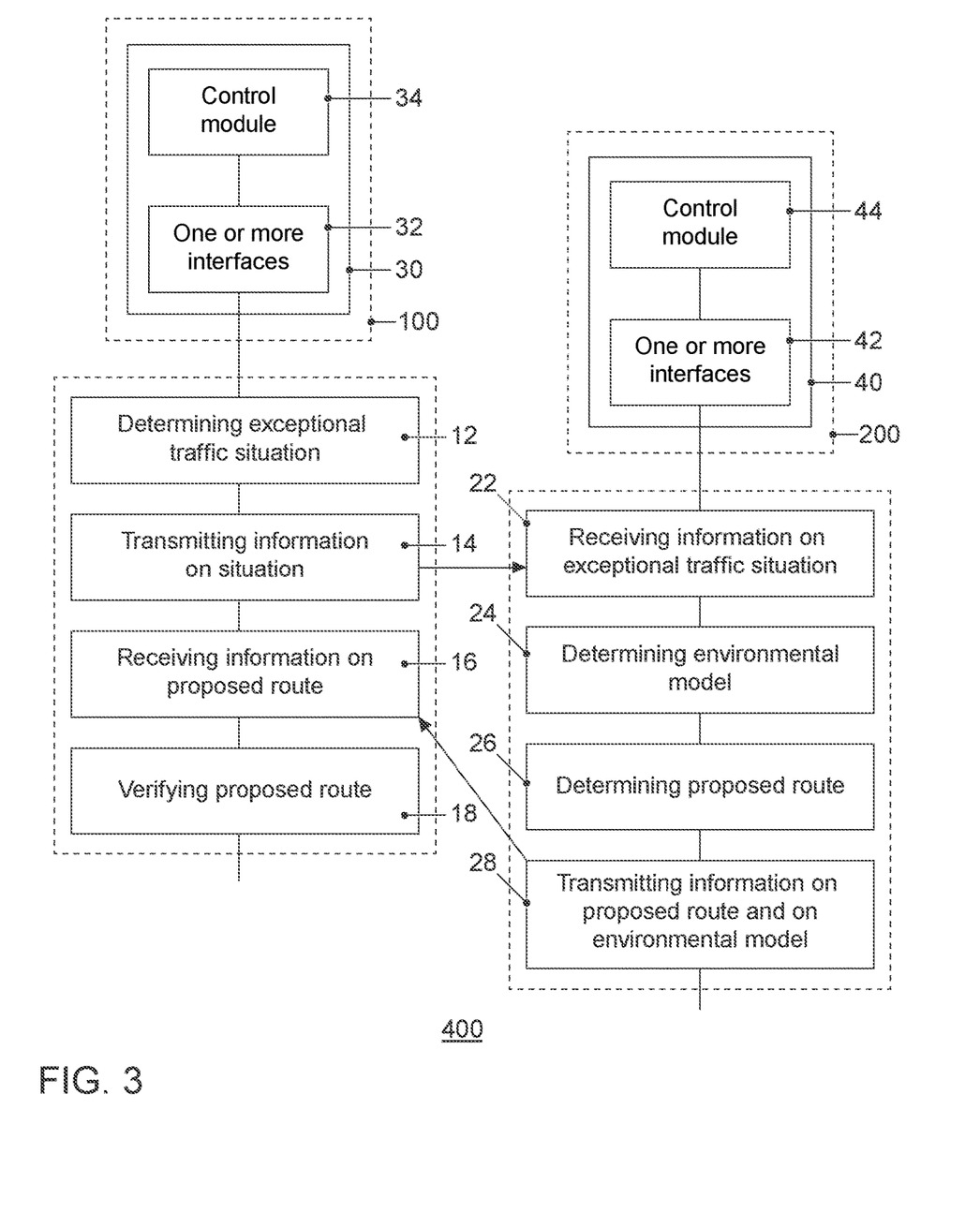
FIG. 3 shows embodiments of an apparatus for a transportation vehicle and a transportation vehicle, embodiments of an apparatus for a network component and a network component, and an embodiment of a system.

FIG. 3 shows disclosed embodiments of an apparatus 30 for a transportation vehicle 100 and a transportation vehicle 100, disclosed embodiments of an apparatus 40 for a network component 200 and a network component 200, and a disclosed embodiment of a system 400. The transportation vehicle 100 and the network component 200 may communicate through the mobile communication system 400. The mobile communication system 400, as shown in FIG. 3, may, for example, correspond to one of the Third Generation Partnership Project (3GPP)-standardized mobile communication networks, where the term mobile communication system is used synonymously to mobile communication network.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component 200, such as a base station transceiver, a relay station or a UE, e.g., coordinating service provision in a cluster or group of multiple UEs. Here and in the following the network component 200 may be a Control Center (CC), which controls remotely operated or tele-operated transportation vehicles. For example, it may correspond to a computer system displaying data (e.g., video streams) obtained from a transportation vehicle to an operator or remote driver of the transportation vehicle. Generally, such a CC may be located as close to a controlled transportation vehicle as possible to keep a latency of the video data in an uplink and the control or steering data in the downlink as short as possible. In some disclosed embodiments communication may be carried out via a base station, which may be collocated with the CC or located close to base station. Signaling may be routed directly from the CC to the transportation vehicle, i.e., on a shortest path to keep the latency and delay as short as possible.

A base station transceiver can be operable or configured to communicate with one or more active mobile transceivers/transportation vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver or transportation vehicle 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

FIG. 3 shows an disclosed embodiment of an apparatus 30 for a UE or transportation vehicle 100, a disclosed embodiment of an apparatus 40 for a network component, and a disclosed embodiment of a system 400. The apparatus 30 for the UE/transportation vehicle 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein.

The apparatus 40 for the network component 200 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 as described herein. The apparatus 40 may be comprised in a CC, a base station, a NodeB, a UE, a relay station, or any service coordinating network entity in disclosed embodiments. It is to be noted that the term network component may comprise multiple sub-components, such as a base station, a server, a CC, etc. A further disclosed embodiment is a transportation vehicle 100 comprising the apparatus 30 and/or a network component 200 comprising the apparatus 40.

In disclosed embodiments the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, application requirements, trigger indications, requests, message interface configurations, feedback, information related to control commands, QoS requirements, QoS time courses, QoS maps, etc.

As shown in FIG. 3 the respective one or more interfaces 32, 42 are coupled to the respective control modules 34, 44 at the apparatuses 30, 40. In disclosed embodiments the control modules 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows a disclosed embodiment of a system 400 comprising disclosed embodiments of UE/transportation vehicle 100, and a network component/base station 200 comprising the apparatus 40. In disclosed embodiments, communication, i.e., transmission, reception or both, may take place among mobile transceivers/transportation vehicles 100 directly and/or between mobile transceivers/transportation vehicles 100 and a network component 200 (infrastructure or mobile transceiver, e.g., a base station, a network server, a backend server, etc.). Such communication may make use of a mobile communication system 400. Such communication may be carried out directly, e.g., by Device-to-Device (D2D) communication, which may also comprise Vehicle-to-Vehicle (V2V) or car-to-car communication in case of transportation vehicles 100. Such communication may be carried out using the specifications of a mobile communication system 400.

In disclosed embodiments the one or more interfaces 32, 42 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

As further illustrated in FIG. 3 the method 10 may be carried out at the apparatus 30 in the transportation vehicle 100. The transportation vehicle 100 may determine the exceptional traffic situation 12 and transmit according information to the network component 200. In turn, the transportation vehicle 100 receives information on the proposed route 16 from the network component 200 and verifies the proposed route 18. In such a disclosed embodiment the network component 200 might not send any information on its own environmental model for the transportation vehicle 100. In a further disclosed embodiment, the method 20 is carried out at the network component 200. In this disclosed embodiment the information on the exceptional traffic situation is received 22 at the network component 200, which also determines 24 an environmental model of the transportation vehicle 100. The proposed route can be determined 26 and can be provided together with information on the network generated environmental model for the transportation vehicle 100 to the transportation vehicle 100. The control module 34 may hence form a consistency check module for the transportation vehicle 100, which carries out consistency checks on proposed paths or routes for tele-operated driving.

A variety of exceptional traffic situations are conceivable. For example, the road may be blocked by another transportation vehicle, a construction side, an accident, flooding etc. Other exceptions may be a closed road, a closed tunnel, unexpected road conditions etc. The transportation vehicle 100 itself may operate multiple sensor systems capturing data of the transportation vehicle's environment. Such data may comprise video data, imaging data, radar data, lidar data (light detection and ranging), temperature data, air pressure data, radio environment data, information received from other transportation vehicles, etc. This data serves as a basis for the environmental model of the transportation vehicle 100. This model may be a digital representation of the environment of the transportation vehicle 100 possibly including other transportation vehicles, objects, roadside infrastructure, traffic signs, pedestrians, etc. Based on this model the unexpected situation can be detected, e.g., an obstacle is detected in the way and passing the obstacle would require passing through a forbidden area, e.g., sidewalk, opposite lane, etc. In some disclosed embodiments the exceptional situation may as well be determined by receiving a traffic message, e.g., a broadcast message from another transportation vehicle.

Tele-operated driving (TD) might become a key technology to solve issues with L4/L5 (high automation/full automation) driven transportation vehicles, such as interpretation issues or deadlocks. The main concept of TD is a transportation vehicle remotely driven by a control center (CC). Between the CC 200 and the transportation vehicle 100 there may be a large distance. They are connected via a radio communication system (e.g., 5G, 4G . . . ) and their backhaul. In a disclosed embodiment a fully automatically driving transportation vehicle gets stopped (also referred to as SAE (Society of Automotive Engineers) level 5 (L5) transportation vehicle). For example, the automated transportation vehicle is not able to continue its planned route because it is not able to interpret the situation.

These issues may occur when automatic driven transportation vehicles are not able to interpret and to solve a situation due to unclear traffic conditions, e.g., an accident, a construction site, unknown obstacle, etc. These transportation vehicles may need external instruction from someone else to solve the situation, which will be the so-called control center (CC). TD transportation vehicles may be driven remotely from the CC.

A transportation vehicle remotely driven receives control data (route or steering data) from the CC. Either it will get a proposed path or it might be controlled directly by the CC, in which case it receives commands that are directly fed to a controller. This implies that the transportation vehicle does not just need to trust the CC but also the transmission in between (security). Disclosed embodiments enable a verification on such a proposed path or route.

Figure 4:
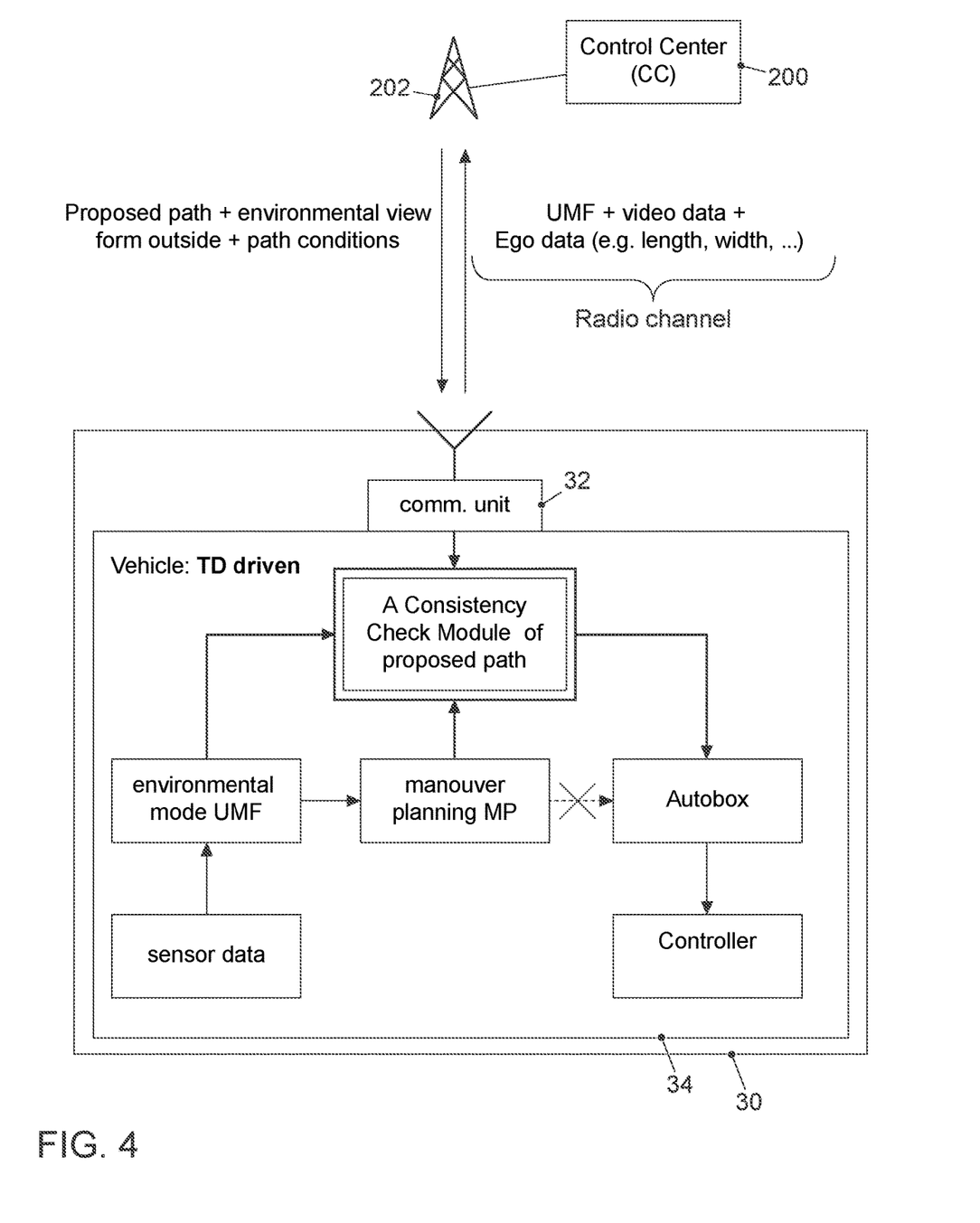
FIG. 4 illustrates a generic overview of logical modules in an embodiment.

FIG. 4 illustrates a generic overview of logical modules in a disclosed embodiment. FIG. 4 shows an implementation of a control module 34 in a disclosed embodiment of an apparatus 30 in a transportation vehicle 100. In this disclosed embodiment the control module 34 comprises multiple further modules, such as a sensor data processing module, an environmental model generation module (UMF from German "Umfeldmodell"), a maneuver planning module (MP), a consistency check module for the proposed path, an autobox, which is in charge for automated driving and which controls a steering controller of the transportation vehicle. The different modules shown in FIG. 4 may be different software modules running on the same processor or hardware. In other disclosed embodiments they may be fully or partly implemented on different processors/controllers or on multiple processors/controllers, which are coupled to each other via respective interfaces.

As shown in FIG. 4 the control module 34 is coupled to a communication unit 32, which is an interface to communicate with a CC 200 via mobile communications, e.g., a 4G/5G base station 202. The control module 34 uses the consistency check module to verify whether the received proposed path is consistent. A consistency check may increase the trust level in the proposed path as the transportation vehicle 100 performs additional internal tests. FIG. 4 is a generic overview of the logical modules at the remotely driven transportation vehicle 100 (left), the radio interference (middle), and the control center 200 (CC) located somewhere else (right). The crossed arrow from the MP module to autobox indicates that for the exceptional traffic situation the MP cannot provide a resolving route. Therefore, the CC 200 is contacted, and the received proposed route is verified/consistency checked.

As shown in FIG. 4 the transportation vehicle apparatus 30 communicates information related to the environmental model, video data, and ego data (e.g., geometrics of the transportation vehicle, length, width, etc.) to the network component 200. In return the apparatus 30 receives information related to the proposed path, the environmental view from the outside (network perspective of the environment of the transportation vehicle 100) and path conditions (for example, road condition (such road ice, aqua planning, height limitation, width limitations), traffic situation, etc.).

Figure 5:
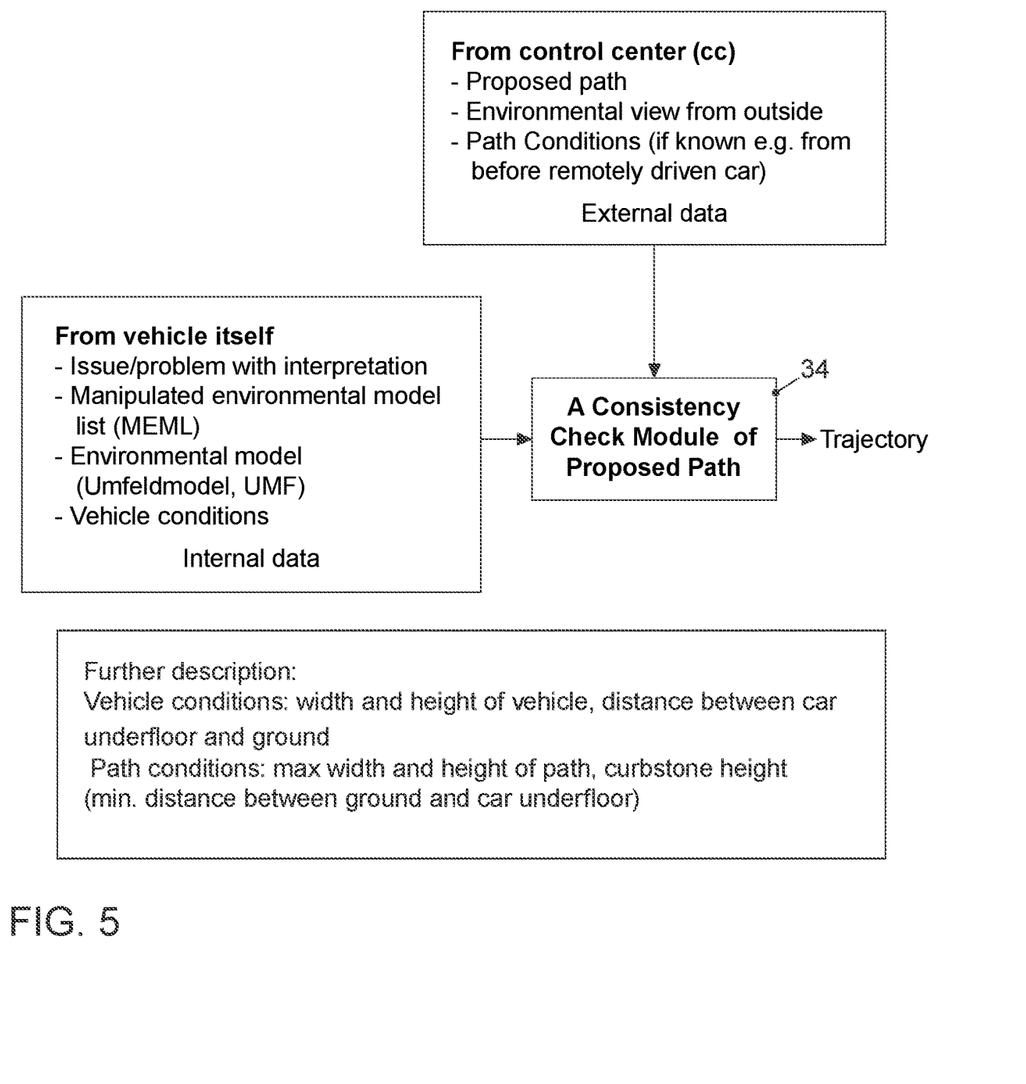
FIG. 5 illustrates internal and external inputs of an embodiment of an apparatus.

FIG. 5 illustrates internal and external inputs of a disclosed embodiment of a control module 34 of an apparatus, which is configured to carry out the above method 10. FIG. 5 shows internal and external inputs for the module 34 for consistency checking of a proposed path coming from the CC 200. From the CC 200 the control module 34 receives information related to a proposed path (route), information related to an environmental view/model from the outside, and information related to path conditions (if known, e.g., from before remotely driven car or transportation vehicles). From the other transportation vehicle components, the control module 34 may receive information related to the issue/problem with interpretation (exceptional traffic situation), information related to the manipulated environmental model list (MEML), information related to the environmental model itself (UMF), and information related to transportation vehicle conditions (width and height of the transportation vehicle 100, distance between car underfloor and ground, path conditions, max width and height of path, curbstone height (e.g., minimal distance between ground and car underfloor, etc.).

A possible implementation of a disclosed embodiment of the method 10 in the module 34 is described in the following operations:

1. Compare transportation vehicle conditions with path conditions, determine whether they are consistent.

In this operation the transportation vehicle may verify whether it can use the path, e.g., if the road conditions are suitable. If not the proposed path or route is rejected.

2. Compare transportation vehicle UMF with external environmental view (they should see the same from different perspectives, i.e., should be consistent after the appropriate reference frame transformation), determine whether they are consistent.

This operation applies in conjunction with method 20, i.e., the network component 200 provides information related to the network generated environmental model and information related to the proposed path. If the models are found to be inconsistent, the proposed path or route is rejected.

3. The transportation vehicle checks 18 the proposed path from the CC 200 with a consistency check algorithm. In some disclosed embodiments this operation may comprise determining one or more route versions resolving the exceptional traffic situation based on the environmental model. Such a route version may be related to a confidence level, which indicates a confidence on whether the route version solves the exceptional traffic situation. For example, according to the environmental model there is a 2% probability that an obstacle is in the way of a first route version. The confidence level of the first route version may then be 98%. A second route version may have a confidence level of 97% and so on. The verifying 18 comprises comparing the information related to the proposed route to the one or more route versions and confidence level may then be used to make a threshold decision. For example, the verifying 18 is considered successful if a confidence level for a route version corresponding to the proposed route is above a predefined threshold. In a further disclosed embodiment the method 10 comprises determining a manipulated environmental model for the transportation vehicle. The manipulated environmental model may comprise hypothetical amendments (presence/absence of objects) of the environmental model with a certain confidence level. The verifying 18 can then be based on the manipulated environmental model. Hence, the consistency check may be based on checking whether the proposed path can be found in the manipulated environmental model of the transportation vehicle 100. Otherwise, it may be deemed not trustworthy/rejected.

4. The transportation vehicle 100 uses the path proposed by the CC 200 after successfully going through operations at 1 to 3.

In some disclosed embodiments, the transportation vehicle 100 compares the proposed path from the CC 200 with its own Manipulated Environmental Model List (MEML) in the above operation at 3. The concept of MEML and possible further operations are explained subsequently. The manipulated environmental model may comprise a manipulated environmental model list of manipulated objects and a corresponding confidence level of the manipulation.

For example, the transportation vehicle 100 is blocked in a situation where it cannot find an appropriate path due to scene misinterpretation or multiple (sensed) temporary obstacles.

In a disclosed embodiment, the transportation vehicle 100 may carry out the following operations:

Operation 0: The transportation vehicle 100 senses its own environmental model (UMF) with objects and corresponding significance level (misinterpretation level, error of type I, false positive, "I see something that does not exist")

of all obstacles. For example, a type I error rate or significance level may be the probability of rejecting a hypothesis (presence of an abject) given that it is true. For example, the significance level for objects detected at the road side is set to 0.05 (5%), implying that it is acceptable to have a 5% probability of incorrectly rejecting the object.

Operation 1: The transportation vehicle 100 calculates possible paths or route versions by manipulating (e.g., taking out) objects with higher significance level. The goal is to manipulate the UMF slightly based on a probability of false positive detection of objects.

Operation 2: The transportation vehicle 100 obtains a list of paths (one or more route versions) with a corresponding probability of type I error (of the manipulated objects)

Operation 3: The transportation vehicle 100 obtains a path proposed by an external source, e.g., CC 200 (operations at 16, 26, 28 above). This path is compared to the paths contained in the MEML, operation at 18.

Operation 4: If the transportation vehicle 100 can find the proposed path (with a possible threshold for misinterpretation probability) it trusts this proposed path.

In another disclosed embodiment the transportation vehicle 100 may follow the following operations:

Operation 0: The transportation vehicle 100 senses its own environmental model (UMF). Transportation vehicle 100 is unsure about the presence of some objects. Regarding this, transportation vehicle 100 is not able to find a path.

Operation 1: The transportation vehicle 100 sends UMF data, video data, and ego data to CC 200. In this disclosed embodiment the transmitting 14 comprises transmitting information related to the environmental model to the network component 200. The CC 200 takes decision of presence of some objects. Additionally, the CC 200 calculates a path for the transportation vehicle. The CC 200 sends new UMF list and calculated path to the transportation vehicle 100 (method 20, operation at 28). The receiving 16 of method 10 on the transportation vehicle 100 side then comprises receiving information related to a modification of the environmental model from the network component 200.

Operation 2: The transportation vehicle 100 adapts its own UMF regarding received data from the CC 200. The method 10 comprises adapting the environmental model based on the information related to the modification from the network component 200.

Operation 3: The transportation vehicle 100 is now able to calculate an own path (route version) through an alleged/potential obstacle. The method 10 comprises determining a route version resolving the exceptional traffic situation based on the adapted environmental model.

Operation 4: The verifying 18 comprises comparing the information related to the proposed route to the route version. The received path (proposed route) and object data from the CC 200 may now be similar to the transportation vehicle path (route version based on manipulated UMF) and UMF data (manipulated UMF). If the verification determines that this is the case the transportation vehicle 100 is able to drive along the verified proposed route.

Operation 5: The transportation vehicle 100 continuously senses for new sudden objects. If the transportation vehicle 100 is not able to find a solution, the procedure in this disclosed embodiment jumps to the above operation at 0.

In a further disclosed embodiment the verifying 18 may further comprise carrying out a plausibility check on the modifications of the environmental model. In other words, before taking the modification into account the apparatus 30/method 10 may conduct a plausibility check on the modifications provided by the network component 200. Such a plausibility check may again be based on confidence levels for the respective details of the environmental model determined by the transportation vehicle 100.

The MEML may be generated by a transportation vehicle 100 that is not able to interpret the situation and is therefore calling the CC 200. The transportation vehicle 100 may first order all objects from its environmental model (UMF) with its misinterpretation probability. Then it manipulates each object so that the transportation vehicle 100 is able to calculate a path. The following table gives an example:

| Path index | Description of object which was manipulated | Coordinates of path through this manipulated object | Misinterpretation probability of the considered object |
|---|---|---|---|
| 1 | Transportation vehicle at position (x, y, z) | [(x, y, z), (x, y, z), (x, y, z), . . . ] | 0.01% |
| 2 | Pedestrian at (x, y, z) | [(x, y, z), (x, y, z), (x, y, z), . . . ] | 15% |
| 3 | Traffic light at (x, y, z) | [(x, y, z), (x, y, z), (x, y, z), . . . ] | 5% |
| . . . | . . . | . . . | . . . |

The transportation vehicle 100 gets a proposed path from the CC 200 and can check if this proposed path already exist in its MEML list. For instance, the transportation vehicle 100 may introduce a threshold for just trusting proposed paths, which exist in the MEML list with a misinterpretation probability of the manipulated object for less than 20%.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It is further to be noted that methods disclosed in the specification or in the claims may be implemented by a device having a method or mechanism for performing each of the respective operations of these methods.

LIST OF REFERENCE SIGNS 10 method for a transportation vehicle
12 determining an exceptional traffic situation based on an environmental model for the transportation vehicle
14 transmitting information related to the exceptional traffic situation to a network component using a mobile communication system
16 receiving information related to a proposed route from a network component
18 verifying the proposed route based on the environmental model of the transportation vehicle
20 method for a network component
22 receiving information related to an exceptional traffic situation from a transportation vehicle
using the mobile communication system
24 determining an environmental model for a transportation vehicle
26 determining a proposed route resolving the exceptional traffic situation for the transportation vehicle
28 transmitting information related to the environmental model and information related to the proposed route to the transportation vehicle
30 apparatus for transportation vehicle
32 one or more interfaces
34 control module
40 apparatus for network component
42 one or more interfaces
44 control module
100 transportation vehicle
200 network component
400 mobile communication system

The invention claimed is:
1. An apparatus for a transportation vehicle, the apparatus comprising:
one or more interfaces to communicate in a mobile communication system;
a plurality of sensors configured to transmit data related to an environment of the transportation vehicle; and
a control module communicatively coupled to the plurality of sensors and configured to control the one or more interfaces, wherein the control module is configured to:
identify an exceptional traffic situation based on an environmental model of the transportation vehicle generated based on the data from the plurality of sensors indicative of the environment of the transportation vehicle,
determine a plurality of manipulated environmental models for the transportation vehicle, wherein each manipulated environmental model includes hypothetical amendments of the environmental model and a confidence level associated with the hypothetical amendments, and wherein the hypothetical amendments include at least one of an added object and a removed object,
transmit, to a network component using the mobile communication system, information related to the environmental model and the exceptional traffic situation,
receive, from the network component, information related to a proposed route and a modified environmental model providing a network perspective of the environmental model, adapt the environmental model based on the information related to the modified environmental model,
determine a plurality of route versions resolving the exceptional traffic situation based on the adapted environmental model, wherein each route version includes a corresponding confidence level that the route version resolves the exceptional traffic situation,
verify the proposed route, wherein the verification includes comparison of the proposed route based on the modified environmental model and each of the route versions based on the adapted environmental model, and performance of a consistency check on the proposed route and each of the route versions, wherein, in response to the proposed route corresponding to one of the route versions, a confidence level of the one of the route versions serves as a first confidence level of the proposed route, wherein the verification further includes determination of whether the proposed route resolves the exceptional traffic situation within at least one of the plurality of manipulated environmental models, wherein, in response to the proposed route resolving the exceptional traffic situation within the at least one manipulated environmental model, a confidence level of the at least one manipulated environmental model serves as a second confidence level of the proposed route, and
operate the transportation vehicle based on one of the proposed routes in response to each of the first confidence level and the second confidence level of the proposed route being greater than a first threshold.

2. A transportation vehicle comprising the apparatus of claim 1.

3. The apparatus of claim 1, wherein the receiving includes receiving information related to a network generated environmental model of the transportation vehicle from the network component, and wherein the verifying further comprises performing a consistency check on the network generated network environmental model and the environmental model of the transportation vehicle.

4. The apparatus of claim 1, wherein the controller controls the apparatus to determine one or more route versions resolving the exceptional traffic situation based on the environmental model, wherein each route version is associated with a confidence level indicating a confidence that the route version solves the exceptional traffic situation, and wherein the verification includes comparing the information related to the proposed route to the one or more route versions.

5. The apparatus of claim 1, wherein the verification is determined to be successful in response to the confidence level associated with the route version and the confidence level corresponding to the proposed route being above a predefined second threshold.

6. The apparatus of claim 1, wherein the manipulated environmental model includes a manipulated environmental model list of manipulated objects, and wherein each manipulated object is associated with a corresponding confidence level of the manipulation of that manipulated object.

7. A non-transitory computer readable medium including a computer program having a program code for performing a method for verification of a proposed route, when the computer program is executed on a computer, a processor, or a programmable hardware component, the method comprising:

identifying an exceptional traffic situation based on an environmental model of a transportation vehicle, wherein the environmental model is generated based on data from a plurality of sensors of the transportation vehicle indicative of an environment of the transportation vehicle;

determining a plurality of manipulated environmental models for the transportation vehicle, wherein each manipulated environmental model includes hypothetical amendments of the environmental model and a confidence level associated with the hypothetical amendments, and wherein the by amendments include at least one of an added object and a removed object;

transmitting, to a network component using a mobile communication system, information related to the environmental model and the exceptional traffic situation;

receiving, from the network component, information related to a proposed route and a modified environmental model providing a network perspective of the environmental model, adapting the environmental model based on the information related to the modified environmental model, determining a plurality of route versions resolving the exceptional traffic situation based on the adapted environmental model, wherein each route version includes a corresponding confidence level that the route version resolves the exceptional traffic situation;

verifying the proposed route by comparing the proposed route based on the modified environmental model and each of the route versions based on the adapted environmental model, performing a consistency check on the proposed route and each of the route versions, wherein, in response to the proposed route corresponding to one of the route versions, a confidence level of the one of the route versions serves as a first confidence level of the proposed route, and determining whether the proposed route resolves the exceptional traffic situation within at least one of the plurality of manipulated environmental models, wherein, in response to the proposed route resolving the exceptional traffic situation within the at least one manipulated environmental model, a confidence level of the at least one manipulated environmental model serves as a second confidence level of the proposed route; and operating the transportation vehicle based on one of the proposed routes in response to each of the first confidence level and the second confidence level of the proposed route being greater than a first threshold.

8. A method for a transportation vehicle and for verifying a proposed route, the method comprising:

identifying an exceptional traffic situation based on an environmental model for a transportation vehicle, wherein the environmental model is generated based on data from a plurality of sensors of the transportation vehicle indicative of an environment of the transportation vehicle;

determining a plurality of manipulated environmental models for the transportation vehicle, wherein each manipulated environmental model includes hypothetical amendments of the environmental model and a confidence level associated with the hypothetical amendments, and wherein the hypothetical amendments include at least one of an added object and a remove object;

transmitting, to a network component using a mobile communication system, information related to the environmental model and the exceptional traffic situation;

receiving, from the network components, information related to a proposed route and a modified environmental model providing a network perspective of the environmental model, adapting the environmental model based on the information related to the modified environmental model, determining a plurality of route versions resolving the exceptional traffic situation based on the adapted environmental model, wherein each route version includes a corresponding confidence level that the route version resolves the exceptional traffic situation;

verifying the proposed route by comparing the proposed route based on the modified environmental model and each of the route versions based on the adapted environmental model, performing a consistency check on the proposed route and each of the route versions, wherein, in response to the proposed route corresponding to one of the route versions, a confidence level of the one of the route versions serves as a first confidence level of the proposed route, and determining whether the proposed route resolves the exceptional traffic situation within at least one of the plurality of manipulated environmental models, wherein, in response to the proposed route resolving the exceptional traffic situation within the at least one manipulated environmental model, a confidence level of the at least one manipulated environmental model serves as a second confidence level of the proposed route; and operating the transportation vehicle based on one of the proposed routes in response to each of the first confidence level and the second confidence level of the proposed route being greater than a first threshold.

9. The method of claim 8, wherein the receiving further comprises receiving information related to a network generated environmental model of the transportation vehicle from the network component, and wherein the verifying further comprises performing a consistency check on the network generated network environmental model and the environmental model of the transportation vehicle.

10. The method of claim 8, further comprising determining one or more route versions resolving the exceptional traffic situation based on the environmental model, wherein each route version is associated with a confidence level indicating a confidence that the route version solves the exceptional traffic situation, and wherein the verification further comprises comparing the information related to the proposed route to the one or more route versions.

11. The method of claim 10, wherein the verifying is determined to be successful in response to the confidence level associated with the route version and the confidence level corresponding to the proposed route being above a second threshold.

12. The method of claim 8, wherein the manipulated environmental model includes a manipulated environmental model list of manipulated objects, and wherein each manipulated object is associated with a corresponding confidence level of the manipulation of that manipulated object.

* * * * *